Dec. 10, 1929.                F. W. EPPERSON                1,738,879
              FROZEN CONFECTION AND METHOD OF PRODUCING SAME
                    Filed Oct. 1, 1925         2 Sheets-Sheet 1

INVENTOR.
FRANK W. EPPERSON
BY Joseph B. Gardner
ATTORNEY

Dec. 10, 1929.  F. W. EPPERSON  1,738,879
FROZEN CONFECTION AND METHOD OF PRODUCING SAME
Filed Oct. 1, 1925  2 Sheets-Sheet 2
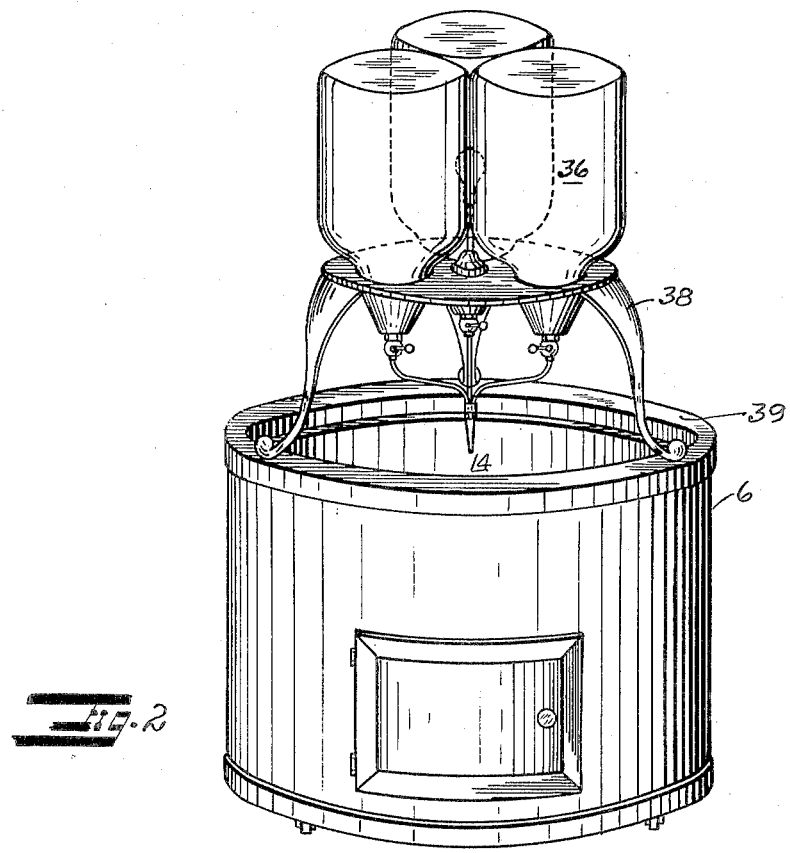
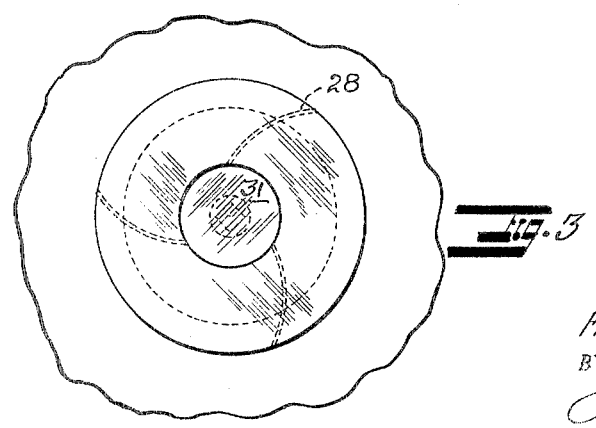
INVENTOR.
FRANK W. EPPERSON.
BY Joseph B. Gardner
ATTORNEY.

Patented Dec. 10, 1929

1,738,879

UNITED STATES PATENT OFFICE

FRANK W. EPPERSON, OF OAKLAND, CALIFORNIA

FROZEN CONFECTION AND METHOD OF PRODUCING SAME

Application filed October 1, 1925. Serial No. 59,818.

My invention relates to a frozen confection and method of making the same.

An object of the invention is to form a liquid or liquid mixture into a confection which will resemble snow.

Another object of the invention is to provide a frozen confection of the character described, the melting of which when exposed to ordinary temperatures will be materially retarded.

A further object of the invention is to provide a confection of the character described which may be readily made before the eyes of the public by simple mechanical means and thus permit the efficient manufacture of the confection by an unskilled operator.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 2 is a perspective view of the apparatus shown in Figure 1.

Figure 3 is a fragmentary plan view of a portion of the apparatus.

Figure 1:
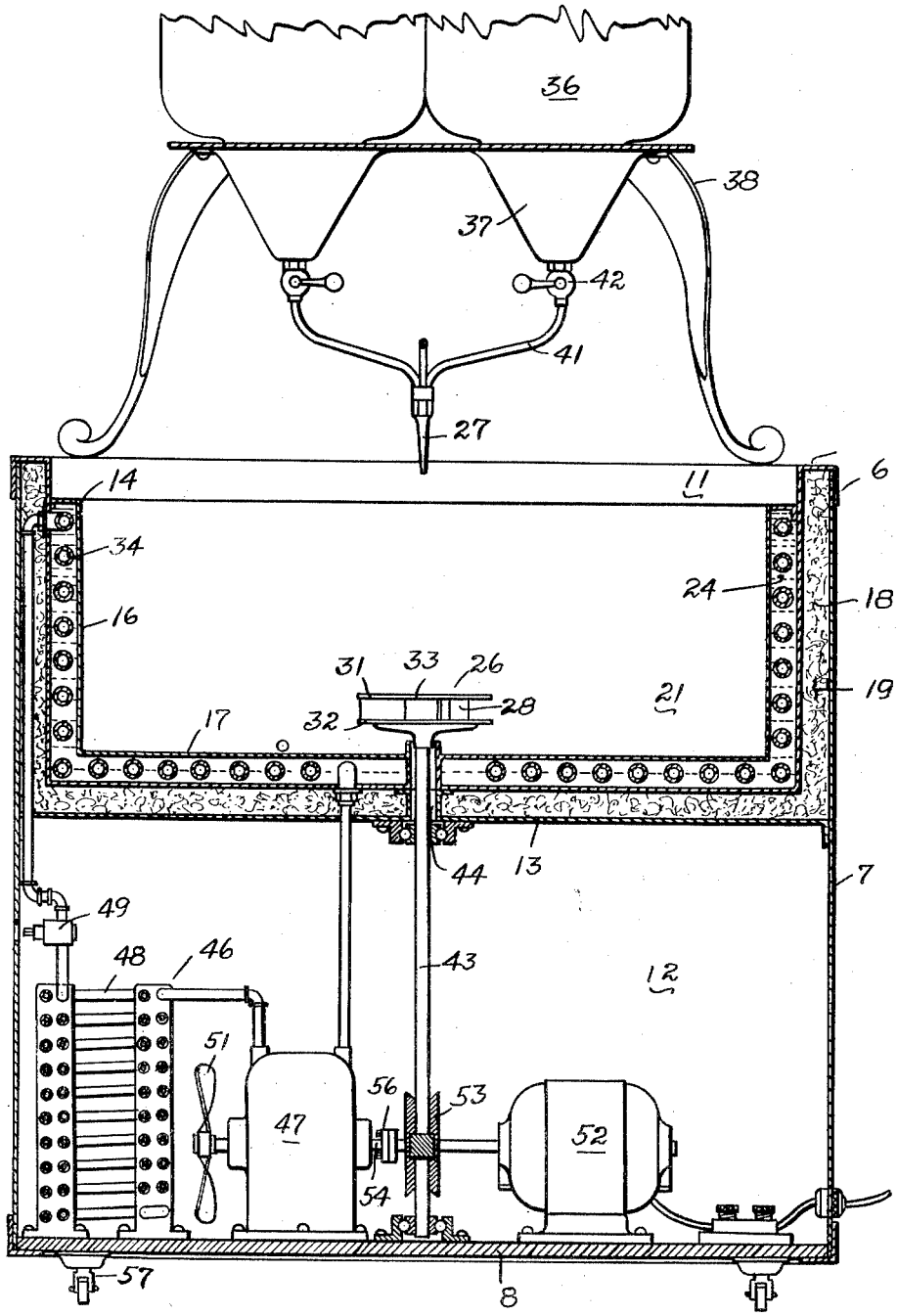
Figure 1 is a side sectional view of an apparatus arranged for the production of the confection of my invention.

In carrying out my invention, a motive has been to produce a frozen confection particularly designed to be made of potable mixtures such as sherbets or other flavored liquids so frozen by artificial means that a mass of the resulting product will possess the physical structure and characteristics of loosely packed snow. In order to secure a confection having the desired qualities, the individual particles thereof preferably comprise combinations of ice crystals frozen into flakes having the flavoring and other ingredients frozen or imprisoned in and between them. Owing to the many-pointed forms naturally assumed by such flakes during their formation it will be understood that a mass of such flakes will be very porous, so that a particularly light, crisp, and palatable frozen confection results. The porosity of the confection, owing to the large proportion of air spaces therein in which cold air is imprisoned, also serves to enhance its heat resisting qualities, so that the ingredients having lower melting temperatures than that of ice may not receive heat enough to melt them within the mass, and the crispness and homogeneity of the confection will be maintained. The confection, it will now be noted, may be placed in and eaten from a container, or may be lightly pressed into an adhering mass having any desired form for handling during its consumption.

To produce the confection, as above described, the preferred method comprises atomizing the liquid to form a spray, projecting the spray in a stream, and cooling the moving spray particles to cause their freezing into crystal form. The preferred method of collecting the product is to project it against a surface kept below the freezing temperature so that the melting of the product upon striking will be avoided and the freezing of any previously unfrozen spray may be accomplished, it being noted that the collecting surface may also be utilized in producing the desired low temperature for freezing the spray. The flavoring and other ingredients are preferably placed in the liquid before or during the atomizing process, so that the product is ready for consumption as soon as the freezing thereof is completed. In this manner a homogeneous, crisp, and palatable confection is arranged to be made by a single process which is adapted to be carried out in an extremely simple manner and with a minimum of apparatus.

Production of the confection of my invention in accordance with the hereinbefore indicated method may be variously accomplished. As illustrated herewith, a compact and entirely self-contained apparatus is shown, such apparatus being so arranged that a unit thereof may be conveniently positioned for manufacturing the confection directly therefrom in the presence of the public. As here shown, the device comprises a housing 6 having a side wall 7 and a base 8, the housing cavity being divided into vertically disposed upper and lower sections 11 and 12 by means of a horizontally extending partition 13 suitably secured to the wall 7. A container 14 having its side walls 16 and bottom 17 hollow is mounted in the section 11, such container being preferably held in spaced relation from the partition 13 and container wall 7, the space 18 thus defined between the tank and adjacent shell portions being filled with a suitable heat insulating material 19. The chamber 21 defined within the container 14 is preferably of cylindrical form, and the various parts of the cavity 24 defined within the container walls and base are preferably in communication to allow free circulation of a fluid therethrough.

The confection of my invention, it will now be noted, is arranged to be produced in the chamber 21 by means operative therein, such means including an atomizer 26 arranged to receive the liquid from a supply nozzle 27 and to force it in the form of spray toward the sides 16 of the chamber. As here shown, the atomizer 26 is of the centrifugal type and comprises a set of radial vanes 28 fixed between top and bottom plates 31 and 32 respectively to form the atomizer head 33. The atomizer head is preferably arranged for axial rotation about the axis of the cylindrical chamber 21, and is positioned adjacent the bottom of the latter. The supply nozzle 27 is here shown arranged to deliver the liquid downwardly in the axial line of the atomizer head, the upper head plate 31 being centrally perforated and the inner blade ends removed to allow the free passage of the liquid onto the lower plate, whence the rotation of the plate will cause the delivery of the liquid into the blades and thence outwardly to form a cylinder of spray, the particles of which move outwardly toward the chamber walls. It will now be noted that the rotation of the atomizer head 33 also causes an outward circulation of air, so that the flow of a mixed stream of spray and air is actually effected upon rotation of the atomizer head.

Cooling of the spray to freezing is here shown effected by utilizing the cavity 24 of the container 14 as a cooling tank, a liquid having a freezing temperature lower than water, such as brine, being placed therein and arranged to be kept at such a temperature that radiation of heat thereto from the spray will cause the congealing of the major portion of the spray in a crystalline form resembling snow prior to its reaching the walls of the chamber. The frozen spray, it will now be noted, upon striking the wall will adhere thereto to form a coating of the confection, the latter then being easily removed for consumption by scraping it from the wall. Expansion coils 34 of a refrigeration system using ammonia, or other gas, as a refrigerant, are here shown placed in the cavity 24 whereby the required low temperature of the chamber walls and bottom may be maintained. It will now be noted that the positioning of the atomizer head near the bottom of the chamber provides for utilizing the heat removing properties of the bottom of the container as well as those of its sides.

Since it may be desired to vary the ingredients of the confection of my invention with a minimum of effort, the liquid supply nozzle 27 is preferably connected with a plurality of closed liquid containers 36. As here shown, the containers are arranged to be inverted with their mouths in funnels 37 provided in a stand 38, the latter being arranged to be removably positioned on top of the upper edge 39 of the supporting shell 6. Each of the funnels 37 is connected to the nozzle 27 by means of a tube 41, these tubes being here shown arranged to support and position the nozzle axially of the atomizer, valves 42 being provided in the various tubes to control the flow of liquid therethrough. In this manner, the confection may be formed either unflavored or with a desired flavor or combination of flavors in an extremely simple manner, or, if desired, flavors may be used alternately to thereby produce a confection having differently flavored layers. It will now be noted that while variations in the velocity or distance of movement of the spray through the chamber or variations in the temperature of the brine will directly influence the physical structure of the confection produced by the apparatus, adjustment to control the qualities of the product may be readily made in apparatus arranged as herein-described.

Rotation and support of the atomizer head 33 is here shown arranged to be effected by means of a vertically disposed shaft 43 secured to the lower plate 32 of the atomizer and extending downwardly into the lower section 12 of the shell cavity through a perforation 44 extending through the chamber bottom and the insulation. The expansion coils 34 are here shown included in the circuit of a refrigeration system 46 having a compressor 47, a cooling radiator 48 and expansion valve 49 therein, all of such parts being carried in the section 12 of the shell cavity. Simultaneous operation of the atomizer, the compressor and a fan 51 for use in circulating air through the radiator is here shown arranged to be effected by means of an electric motor 52 mounted in the section 12 and operatively connected to the shaft 43 by means of suitable worm gearing 53, and directly connected to the compressor shaft 54 by means of a coupling 56, the latter shaft also carrying the fan 51. In this manner a most compact apparatus has been produced, smaller units of the same being adapted to be moved about on casters 57 fixed to the base 8 of the supporting shell 6.

I claim:—

1. The method of forming a frozen confection which comprises simultaneously atomizing and mixing with air the different ingredients of the confection to form a common centrifugally thrown spray thereof, and throwing said spray into a space maintained at a freezing temperature for said ingredients.

2. In a device for making a frozen confection composed of a normally liquid material a single means operative for simultaneously producing an air stream, atomizing said material and projecting said atomized material into said air stream, a surface against which said stream is arranged to be directed, and means for maintaining the temperature of said surface at such a value as will cause the crystalline congealment of said material in said stream.

3. In a device for makinig a frozen confection composed of normally liquid material, a chamber for congealation, and a single means operative for simultaneously producing a circulation of the air in said chamber, atomizing said materials, and projecting said atomized materials into said air stream.

In testimony whereof, I have hereunto set my hand at Oakland, California, this 18th day of September, 1925.

F. W. EPPERSON.